(12) United States Patent
Yamamoto et al.

(10) Patent No.: US 9,005,064 B2
(45) Date of Patent: Apr. 14, 2015

(54) VEHICLE

(71) Applicants: Masafumi Yamamoto, Toyota (JP); Atsushi Tabata, Okazaki (JP); Koichi Okuda, Toyota (JP); Keita Imai, Toyota (JP); Keisuke Omuro, Toyota (JP)

(72) Inventors: Masafumi Yamamoto, Toyota (JP); Atsushi Tabata, Okazaki (JP); Koichi Okuda, Toyota (JP); Keita Imai, Toyota (JP); Keisuke Omuro, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/140,129

(22) Filed: Dec. 24, 2013

(65) Prior Publication Data
US 2014/0179477 A1    Jun. 26, 2014

(30) Foreign Application Priority Data
Dec. 25, 2012    (JP) ................. 2012-280922

(51) Int. Cl.
| | |
|---|---|
| F16H 3/72 | (2006.01) |
| F16H 37/06 | (2006.01) |
| F16H 57/04 | (2010.01) |
| B60K 6/20 | (2007.10) |
| B60K 6/12 | (2006.01) |
| F16H 57/00 | (2012.01) |
| H02K 9/19 | (2006.01) |
| B60L 3/00 | (2006.01) |
| B60L 11/12 | (2006.01) |
| B60L 11/14 | (2006.01) |
| B60L 15/20 | (2006.01) |
| F16H 61/00 | (2006.01) |

(52) U.S. Cl.
CPC ... *B60K 6/20* (2013.01); *B60K 6/12* (2013.01); *Y10S 903/902* (2013.01); *F16H 57/0025* (2013.01); *F16H 57/0435* (2013.01); *F16H 57/0436* (2013.01); *F16H 57/0446* (2013.01); *F16H 57/0476* (2013.01); *H02K 9/19* (2013.01); *F16H 2061/0037* (2013.01); *F16H 61/0031* (2013.01); *B60L 3/0038* (2013.01); *B60L 3/0061* (2013.01); *B60L 11/123* (2013.01); *B60L 11/14* (2013.01); *B60L 15/2009* (2013.01); *B60L 2240/12* (2013.01); *B60L 2240/36* (2013.01); *B60L 2240/423* (2013.01); *B60L 2240/441* (2013.01); *B60L 2240/443* (2013.01); *B60L 2240/486* (2013.01); *B60L 2250/26* (2013.01)

(58) Field of Classification Search
None
See application file for complete search history.

(56) References Cited

U.S. PATENT DOCUMENTS

| | | | |
|---|---|---|---|
| 2007/0049442 A1* | 3/2007 | Long et al. .................. | 475/5 |
| 2007/0293362 A1* | 12/2007 | Kamada et al. ............. | 475/5 |
| 2008/0103003 A1 | 5/2008 | Sah et al. | |
| 2011/0070991 A1* | 3/2011 | Wu et al. .................... | 475/5 |

FOREIGN PATENT DOCUMENTS

| | | |
|---|---|---|
| JP | 2008-265598 A | 11/2008 |
| JP | 201083361 A | 4/2010 |

\* cited by examiner

*Primary Examiner* — Justin Holmes
*Assistant Examiner* — Timothy Hannon
(74) *Attorney, Agent, or Firm* — Sughrue Mion, PLLC (57) ABSTRACT

A vehicle using a first MG, a second MG, and an engine as drive sources includes an electric oil pump, a mechanical oil pump driven by power of the engine, and a hydraulic circuit. The hydraulic circuit includes first oil passages for supplying oil to the first MG, a second oil passage for supplying oil to the second MG, a switch-over valve capable of switching over states of communication of the first oil passage, and a switch control valve that outputs pilot hydraulic pressure to the switch-over valve. States of the switch-over valve are switched over in accordance with hydraulic pressure from the switch control valve and hydraulic pressure from the mechanical pump.

4 Claims, 9 Drawing Sheets

<DUAL MOTOR TRAVEL>

FIG. 7

<SINGLE MOTOR TRAVEL>

FIG. 9

| MODE | | ECU COMMAND | SWITCH-OVER VALVE | DESTINATION OF OIL SUPPLY |
|---|---|---|---|---|
| MOTOR TRAVEL | DUAL MOTOR TRAVEL | OFF COMMAND | OFF STATE | MG1, MG2 |
| | SINGLE MOTOR TRAVEL | ON COMMAND | ON STATE | MG2 |
| ENGINE TRAVEL | | OFF COMMAND (ON COMMAND CAN BE ISSUED) | OFF STATE | MG1, MG2 |

VEHICLE

INCORPORATION BY REFERENCE

The disclosure of Japanese Patent Application No. 2012-280922 filed on Dec. 25, 2012 including the specification, drawings and abstract is incorporated herein by reference in its entirety.

BACKGROUND OF THE INVENTION

1. Field of the Invention

This invention relates to a vehicle including a first motor, a second motor, and an engine as drive sources.

2. Description of Related Art

Japanese Patent Application Publication No. 2008-265598 (JP 2008-265598A) discloses a vehicle including a planetary gear mechanism to which a first motor, a second motor, and an engine are coupled and a clutch that fixes an engine shaft, wherein fixing the engine shaft with the clutch enables the vehicle to travel using power of at least one of the first motor and the second motor without using power of the engine (hereinafter, referred to as "motor travel").

The vehicle disclosed in JP 2008-265598A is capable of switching between engine travel that uses the power of the engine and motor travel that does not use the power of the engine. In addition, during motor travel, the vehicle can switch between dual motor travel that uses power of both the first motor and the second motor and single motor travel that only uses power of one of the first motor and the second motor. Supplying cooling oil to both the first motor and the second motor without taking these modes (engine travel, dual motor travel, and single motor travel) into consideration may possibly cause an unnecessary increase in loss (so-called drag loss) attributable to viscosity of the cooling oil.

SUMMARY OF THE INVENTION

An object of the invention is to reduce drag loss of motors in a vehicle including a first motor, a second motor, and an engine as drive sources.

A vehicle according to a first aspect of the invention is a vehicle including a first motor, a second motor, and an engine as drive sources, the vehicle including a mechanical pump that discharges oil using power from the engine, an electric pump that discharges oil using electricity, a first oil passage for supplying oil discharged from at least one of the mechanical pump and the electric pump to the first motor, a second oil passage for supplying oil discharged from at least one of the mechanical pump and the electric pump to the second motor, a switch-over valve provided on the first oil passage and capable of switching over to any of a first state in which the oil flowing through the first oil passage is allowed to be supplied to the first motor and a second state in which the oil flowing through the first oil passage is not allowed to be supplied to the first motor, and a switch control valve that outputs hydraulic pressure to the switch-over valve. The switch-over valve is configured to switch over to any of the first state and the second state in accordance with the hydraulic pressure from the switch control valve and hydraulic pressure from the mechanical pump.

The switch control valve may be a solenoid valve. The vehicle may further include a pressure regulating valve that regulates the hydraulic pressure from the mechanical pump and outputs the regulated hydraulic pressure to the switch-over valve. The switch-over valve may be configured to switch over to any of the first state and the second state in accordance with the hydraulic pressure from the solenoid valve and the hydraulic pressure from the pressure regulating valve.

The switch-over valve may be configured to enter the first state if the hydraulic pressure from the solenoid valve is not inputted and to enter the second state if the hydraulic pressure from the solenoid valve is inputted when the hydraulic pressure from the pressure regulating valve is not inputted, and to enter the first state regardless of whether or not the hydraulic pressure from the solenoid valve is inputted when the hydraulic pressure from the pressure regulating valve is inputted.

The switch-over valve may be configured to supply the oil flowing through the first oil passage to the second motor when the switch-over valve is in the second state.

The vehicle may further include a control unit that controls the solenoid valve. The control unit controls the solenoid valve so that the switch-over valve is in the first state during dual motor travel of the vehicle in which the vehicle travels using power of the first motor and the second motor without using power of the engine, and controls the solenoid valve so that the switch-over valve is in the second state during single motor travel of the vehicle in which the vehicle travels using power of the second motor without using power of the engine and the first motor.

The control unit may control the solenoid valve so that the switch-over valve temporarily switches over from the second state to the first state when at least any of a condition that a duration of the single motor travel exceeds a prescribed period of time and a condition that a travel distance by the single motor travel exceeds a prescribed distance is satisfied.

The vehicle may further include a planetary gear mechanism including a first rotary element coupled to the first motor, a second rotary element coupled to the second motor, and a third rotary element coupled to the engine, a fixing apparatus that prevents the engine from rotating, and a transmission provided between the second rotary element and a drive wheel of the vehicle.

According to the configuration described above, drag loss of motors can be reduced in a vehicle including a first motor, a second motor, and an engine as drive sources.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the drawings. In the following description, like parts are denoted by like reference numerals. The same applies to the names and functions of such parts. Therefore, detailed descriptions of such parts will not be repeated.

Figure 1:
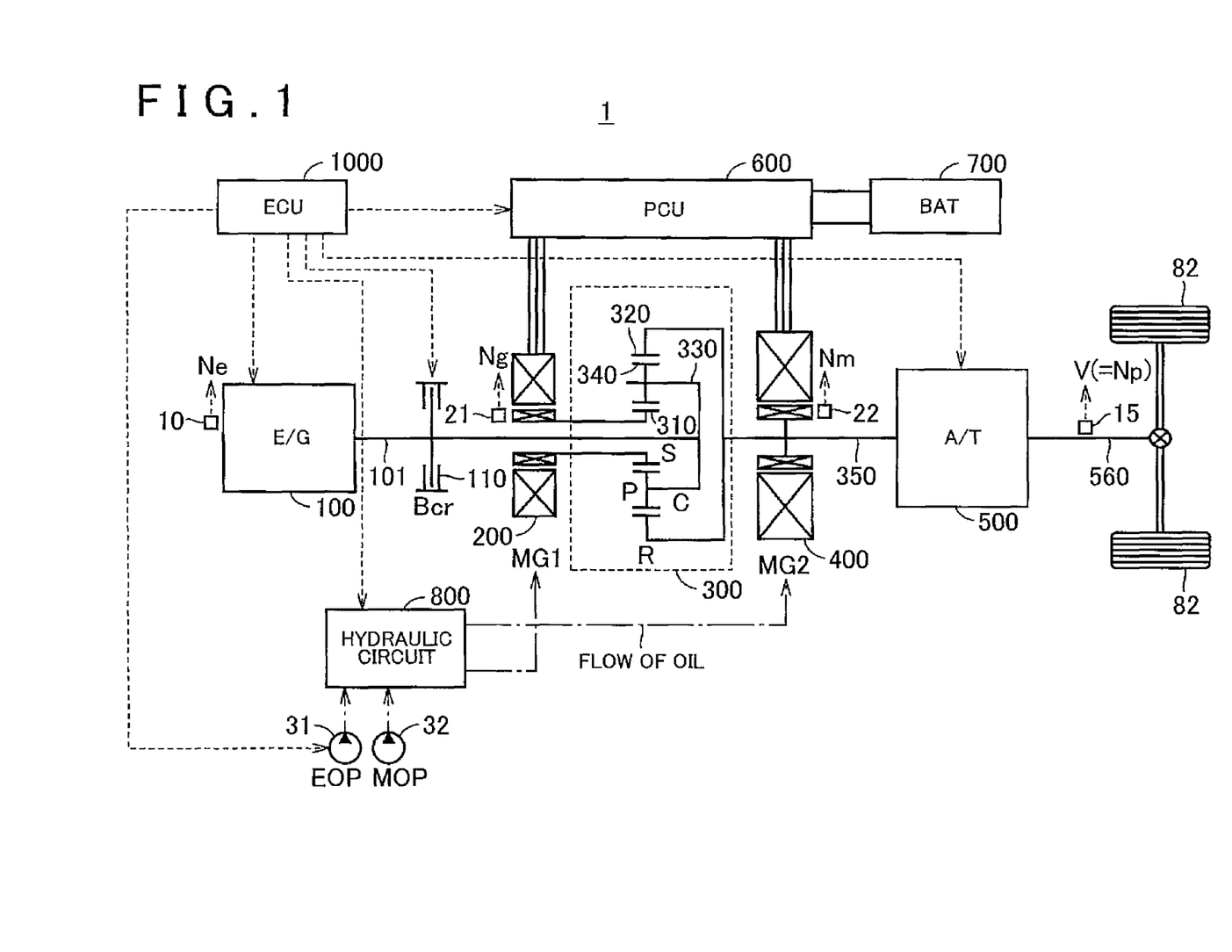
FIG. 1 is an overall block diagram of a vehicle.

FIG. 1 is an overall block diagram of a vehicle 1 according to the present embodiment. The vehicle 1 travels by rotating a drive wheel 82. The vehicle 1 includes an engine (E/G) 100, a brake (Bcr) 110, a first motor generator (hereinafter, referred to as a "first MG") 200, a power splitting apparatus 300, a second motor generator (hereinafter, referred to as a "second MG") 400, an automatic transmission (A/T) 500, a power control unit (hereinafter, referred to as a "PCU") 600, a battery 700, and an electronic control unit (hereinafter, referred to as an "ECU") 1000.

The engine 100 generates power for rotating the drive wheel 82. The power generated by the engine 100 is inputted to the power splitting apparatus 300.

The power splitting apparatus 300 splits the power inputted from the engine 100 into power transmitted to the drive wheel 82 via the A/T 500 and power transmitted to the first MG 200.

The power splitting apparatus 300 is a planetary gear mechanism (a differential mechanism) including a sun gear (S) 310, a ring gear (R) 320, a carrier (C) 330, and a pinion gear (P) 340. The sun gear (S) 310 is coupled to a rotor of the first MG 200. The ring gear (R) 320 is coupled to the drive wheel 82 via the A/T 500. The pinion gear (P) 340 meshes with the sun gear (S) 310 and the ring gear (R) 320. The carrier (C) 330 rotatably and revolvably holds the pinion gear (P) 340. The carrier (C) 330 is coupled to a crankshaft 101 of the engine 100.

The brake 110 is an apparatus for fixing the crankshaft 101. The brake 110 is controlled to be in an engaged state or a disengaged state in accordance with a control signal from the ECU 1000. The engaged state of the brake 110 is a state in which the crankshaft 101 is fixed and is unable to rotate. The disengaged state of the brake 110 is a state in which the crankshaft 101 is rotatable. Moreover, the brake 110 may be a friction material brake or a dog clutch brake.

The first MG 200 and the second MG 400 are alternating current (AC) rotary electric machines and function as both motors and generators. The second MG 400 is provided between the power splitting apparatus 300 and the A/T 500. More specifically, a rotor of the second MG 400 is connected to a rotary shaft 350 that couples the ring gear (R) 320 of the power splitting apparatus 300 and an input shaft of the A/T 500 to each other.

The A/T 500 is provided between the rotary shaft 350 and a drive shaft 560. The A/T 500 switches over a speed ratio (a ratio of an input shaft rotational speed with respect to an output shaft rotational speed) in accordance with a control signal from the ECU 1000 to any one of a plurality of speed stages (speed ratios) determined in advance.

The PCU 600 converts direct current (DC) power supplied from the battery 700 into AC power and outputs the AC power to the first MG 200 and/or the second MG 400. As a result, the first MG 200 and/or the second MG 400 are driven. In addition, the PCU 600 converts AC power generated by the first MG 200 and/or the second MG 400 into DC power and outputs the DC power to the battery 700. As a result, the battery 700 is charged.

The battery 700 stores high-voltage (for example, around 200 V) DC power for driving the first MG 200 and/or the second MG 400. The battery 700 is typically configured so as to include nickel hydride or lithium ions. Alternatively, a large-capacity capacitor can be adopted in place of the battery 700.

The vehicle 1 further includes an engine rotational speed sensor 10, a vehicle speed sensor 15, and resolvers 21 and 22. The engine rotational speed sensor 10 detects a rotational speed of the engine 100 (hereinafter, referred to as an "engine rotational speed Ne"). The vehicle speed sensor 15 detects a rotational speed of the drive shaft 560 as a vehicle speed V. The resolver 21 detects a rotational speed of the first MG 200 (hereinafter, referred to as a "first MG rotational speed Ng"). The resolver 22 detects a rotational speed of the second MG 400 (hereinafter, referred to as a "second MG rotational speed Nm"). These sensors output detection results to the ECU 1000.

The vehicle 1 further includes an electric oil pump (hereinafter, also referred to as an "EOP") 31, a mechanical oil pump (hereinafter, also referred to as an "MOP") 32, and a hydraulic circuit 800.

The EOP 31 is driven by electric power (more specifically, power of a motor (not shown)) to pump oil stored in an oil pan and supplies the pumped oil to the hydraulic circuit 800. Therefore, the EOP 31 can be driven even when the engine 100 is stopped. The EOP 31 is controlled according to a control signal from the ECU 1000.

On the other hand, the MOP 32 is driven by power of the engine 100 to pump oil stored in the oil pan and supplies the pumped oil to the hydraulic circuit 800. Therefore, the MOP 32 is driven when the engine 100 is in operation and is stopped when the engine 100 is stopped.

The hydraulic circuit 800 supplies oil from at least one of the EOP 31 and the MOP 32 to the first MG 200 and the second MG 400. The oil supplied to the first MG 200 and the second MG 400 acts as a lubricating oil and a cooling oil of the first MG 200 and the second MG 400. A dashed-dotted line shown in FIG. 1 represents a flow of oil from the hydraulic circuit 800 to the first MG 200 and the second MG 400. Moreover, although not shown in FIG. 1, the hydraulic circuit 800 also supplies oil to the brake 110, the power splitting apparatus 300, and the A/T 500. A detailed configuration of the hydraulic circuit 800 will be described later.

The ECU 1000 has a built-in central processing unit (CPU) and a built-in memory (both not shown) and executes prescribed arithmetic processing based on information stored in the memory or information from the respective sensors. The ECU 1000 controls respective devices mounted on the vehicle 1 based on results of the arithmetic processing.

The vehicle 1 is capable of traveling in any mode of engine travel and motor travel. During engine travel, the vehicle 1 travels using power from the engine 100 in addition to the power from the first MG 200 and the second MG 400. During engine travel, the brake 110 is placed in a disengaged state.

On the other hand, during motor travel, the vehicle 1 travels using power of at least one of the first MG 200 and the second MG 400 without using power of the engine 100. During motor travel, the crankshaft 101 is nonrotatably fixed by the brake 110. As shown, during motor travel, due to the crankshaft 101 being fixed by the brake 110, motor travel can be switched over to travel using the power of both the first MG 200 and the second MG 400 (hereinafter, also referred to as "dual motor travel") and to travel using the power of the second MG 400 without using the power of the first MG 200 (hereinafter, also referred to as "single motor travel").

Figure 2:
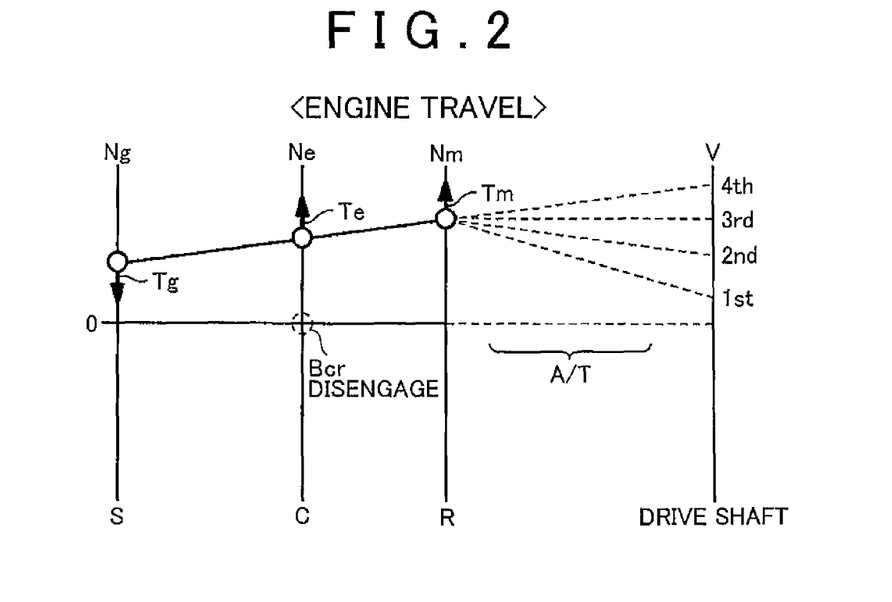
FIG. 2 is an alignment chart of a power splitting apparatus during engine travel.
Figure 3:
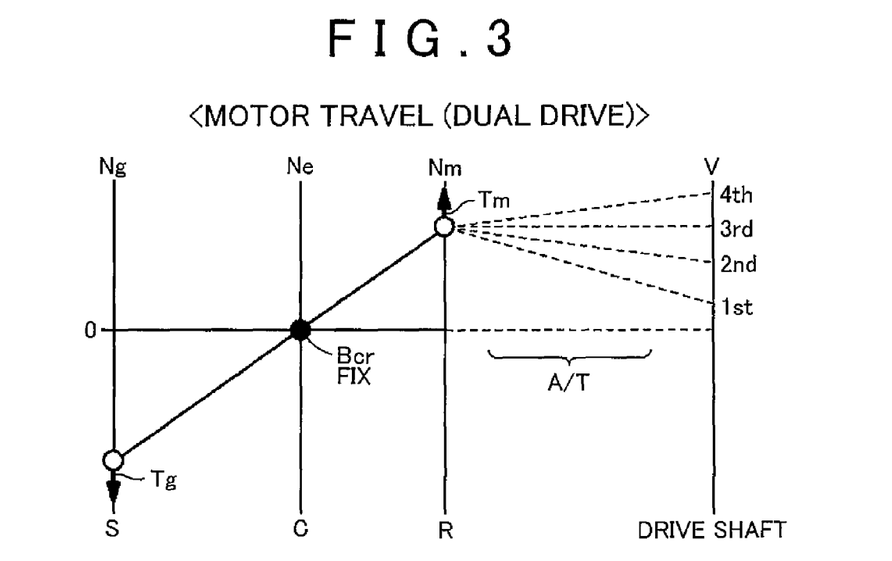
FIG. 3 is an alignment chart of a power splitting apparatus during dual motor travel.
Figure 4:
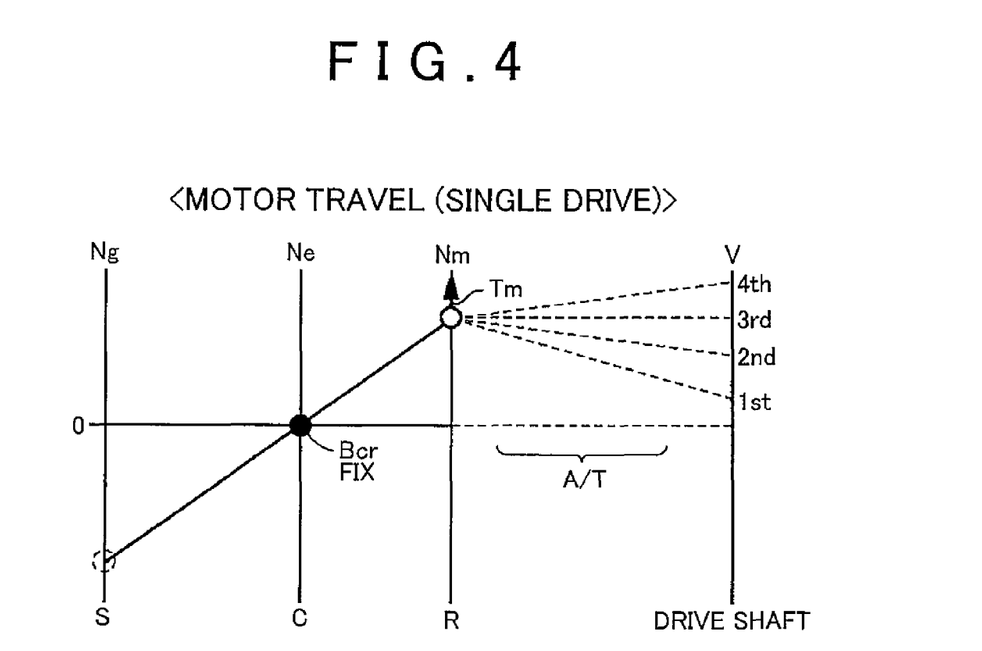
FIG. 4 is an alignment chart of a power splitting apparatus during single motor travel.

FIGS. 2 to 4 respectively show alignment charts of the power splitting apparatus 300 during engine travel, dual motor travel, and single motor travel. Due to the power splitting apparatus 300 being configured as described above, as shown in FIGS. 2 to 4, a rotational speed of the sun gear (S) 310 (in other words, the first MG rotational speed Ng), a rotational speed of the carrier (C) 330 (in other words, the engine rotational speed Ne), and a rotational speed of the ring gear (R) 320 (in other words, the second MG rotational speed Nm) form a relationship in which the rotational speeds are connected by straight lines on an alignment chart of the power splitting apparatus 300 (a relationship in which once any two rotational speeds are determined, the remaining rotational speed is determined). Moreover, the A/T 500 is provided between the ring gear (R) 320 and the drive shaft 560. Therefore, a ratio of the second MG rotational speed Nm and the vehicle speed V is determined by a speed stage (a speed ratio) formed by the A/T 500. FIGS. 2 to 4 exemplify cases where any forward speed stage of first to fourth speeds can be formed by the A/T 500.

As shown in FIG. 2, during engine travel, the brake 110 is disengaged and the drive shaft 560 is rotated using a first MG torque Tg, a second MG torque Tm, and an engine torque Te.

As shown in FIG. 3, during dual motor travel, the crankshaft 101 is fixed by the brake 110 and the drive shaft 560 is rotated using both the first MG torque Tg and the second MG torque Tm.

As shown in FIG. 4, during single motor travel, the crankshaft 101 is fixed by the brake 110 and the drive shaft 560 is rotated using the second MG torque Tm. In doing so, as shown in FIG. 4, the first MG 200 is rotated with the rotation of the second MG 400.

As described above, the vehicle 1 according to the present embodiment is capable of switching between dual motor travel and single motor travel during motor travel. Uniformly supplying a cooling oil to both motors without taking these modes into consideration may possibly cause an unnecessary increase in so-called drag loss. In other words, when a same amount of the cooling oil as supplied during dual motor travel is supplied to the first MG 200 during single motor travel that does not use the first MG 200, an unnecessary increase in drag loss occurs at the first MG 200.

In consideration thereof, the hydraulic circuit 800 according to the present embodiment includes a circuit for cutting off the supply of oil to the first MG 200 during single motor travel. Accordingly, drag loss that occurs at the first MG 200 during single motor travel is reduced.

Figure 5:
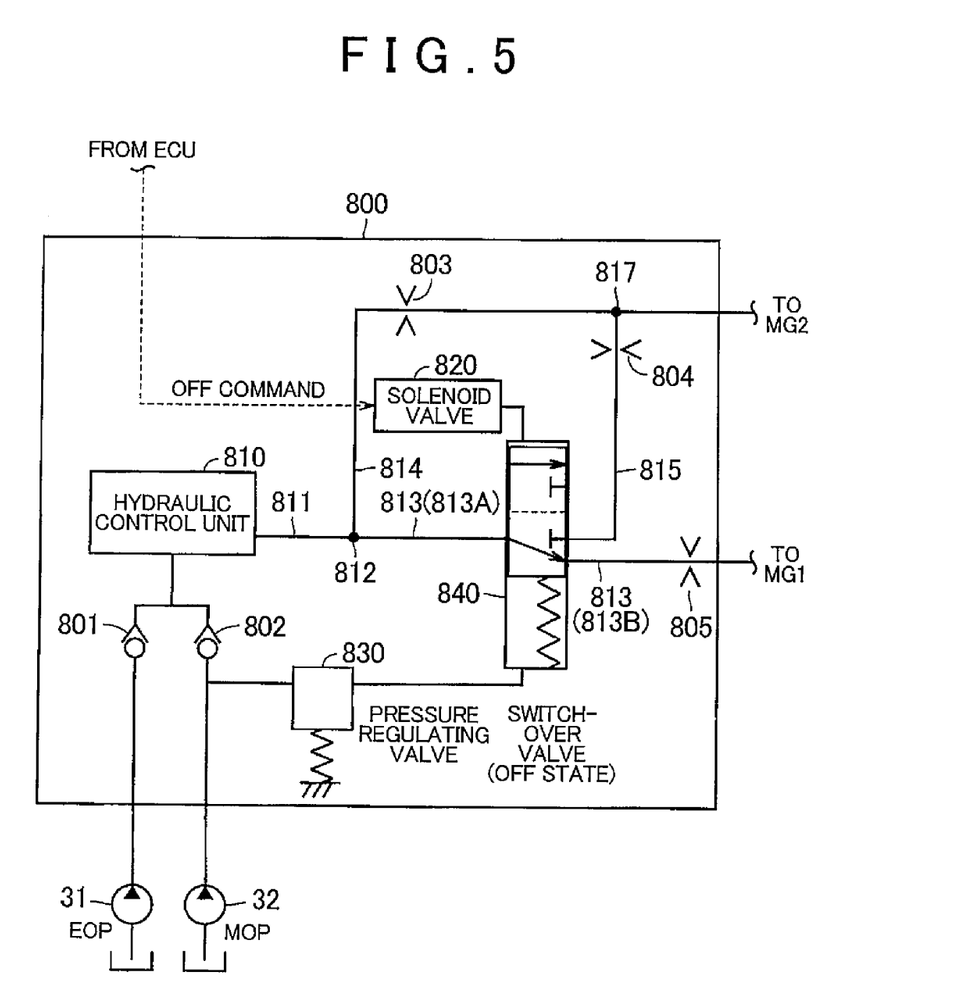
FIG. 5 is a diagram showing a detailed configuration of a hydraulic circuit.

FIG. 5 is a diagram showing a detailed configuration of the hydraulic circuit 800. The hydraulic circuit 800 is configured to include a hydraulic control unit 810, a solenoid valve 820, a pressure regulating valve 830, and a switch-over valve 840.

Oil discharged by the EOP 31 and the MOP 32 is supplied to the hydraulic control unit 810. Moreover, a check valve 801 is provided between the EOP 31 and the hydraulic control unit 810 and a check valve 802 is provided between the MOP 32 and the hydraulic control unit 810. Providing the check valves 801 and 802 prevents a backflow of oil into one of the oil pumps when oil is being discharged from the other oil pump.

The hydraulic control unit 810 outputs oil from at least one of the EOP 31 and the MOP 32 to an oil passage 811. The oil passage 811 branches at a branching section 812 into a first oil passage 813 for supplying oil to the first MG 200 and a second oil passage 814 for supplying oil to the second MG 400. The second oil passage 814 is communicated with the second MG 400.

The switch-over valve 840 is provided on the first oil passage 813. In other words, the first oil passage 813 is configured to include a first oil passage 813A between the branching section 812 and the switch-over valve 840 and a first oil passage 813B between the switch-over valve 840 and the first MG 200.

The first oil passage 813A is communicated with any one of a recirculation passage 815 and the first oil passage 813B via the switch-over valve 840. The recirculation passage 815 merges with the second oil passage 814 at a confluence section 817.

Orifices 803 to 805 for regulating an oil flow rate are respectively provided at the first oil passage 813B, the second oil passage 814, and the recirculation passage 815.

The solenoid valve 820 is a switch-over control valve for switching between states of the switch-over valve 840. When the solenoid valve 820 is placed in an energized state according to an ON command from the ECU 1000, the solenoid valve 820 outputs pilot hydraulic pressure to the switch-over valve 840. On the other hand, when the solenoid valve 820 is placed in a non-energized state according to an OFF command from the ECU 1000, the solenoid valve 820 does not output pilot hydraulic pressure to the switch-over valve 840.

The pressure regulating valve 830 regulates hydraulic pressure from the MOP 32 and outputs the regulated hydraulic pressure to the switch-over valve 840 as backup hydraulic pressure.

The switch-over valve 840 is configured to include a spool capable of moving inside a cylinder in a vertical direction and a spring that connects a lower surface of the spool with a lower surface of the cylinder. Pilot hydraulic pressure from the switch-over valve 840 is inputted into a cylinder on an upper side of the spool. Pilot hydraulic pressure from the pressure regulating valve 830 is inputted into a cylinder on a lower side of the spool.

In accordance with the pilot hydraulic pressure from the solenoid valve 820 and the backup hydraulic pressure from the pressure regulating valve 830, the state of the switch-over valve 840 is switched over to any of a state in which the first oil passage 813A and the first oil passage 813B are communicated with each other (hereinafter, referred to as an "OFF state") and a state in which the first oil passage 813A and the recirculation passage 815 are communicated with each other (hereinafter, referred to as an "ON state").

When the backup hydraulic pressure from the pressure regulating valve 830 is not inputted (in other words, when the engine 100 is stopped and the MOP 32 is also stopped), the state of the switch-over valve 840 is switched in accordance with the pilot hydraulic pressure. Specifically, when the pilot hydraulic pressure is not inputted, the spool is maintained at an initial position by the spring and a state is created in which the first oil passage 813A and the first oil passage 813B are communicated with each other. This state is the OFF state described above. Moreover, FIG. 5 shows a case where the switch-over valve 840 is in the OFF state. Conversely, when the pilot hydraulic pressure is inputted, the spring contracts from the initial state due to the pilot hydraulic pressure and the spool is pushed downward to create a state in which the first oil passage 813A and the recirculation passage 815 are communicated with each other. This state is the ON state described above (refer to FIG. 7 to be described later).

On the other hand, when the backup hydraulic pressure from the pressure regulating valve 830 is inputted (in other words, when the engine 100 is in operation and the MOP 32 is also in operation), regardless of whether or not the pilot hydraulic pressure is inputted, the spool is pushed up to the initial position by the backup hydraulic pressure and an elastic force of the spring to create the OFF state (refer to FIG. 8 to be described later). In other words, in the present embodiment, the pilot hydraulic pressure, the backup hydraulic pressure, and the elastic force of the spring are regulated so that a force with which the pilot hydraulic pressure pushes the spool downward is greater than a force with which the spring pushes the spool upward and that a force with which the backup hydraulic pressure and the spring push the spool upward is greater than a force with which the pilot hydraulic pressure pushes the spool downward.

During dual motor travel, the ECU 1000 places the switch-over valve 840 in the OFF state by outputting an OFF command to the solenoid valve 820. During single motor travel, the ECU 1000 places the switch-over valve 840 in the ON state by outputting an ON command to the solenoid valve 820.

Figure 6:
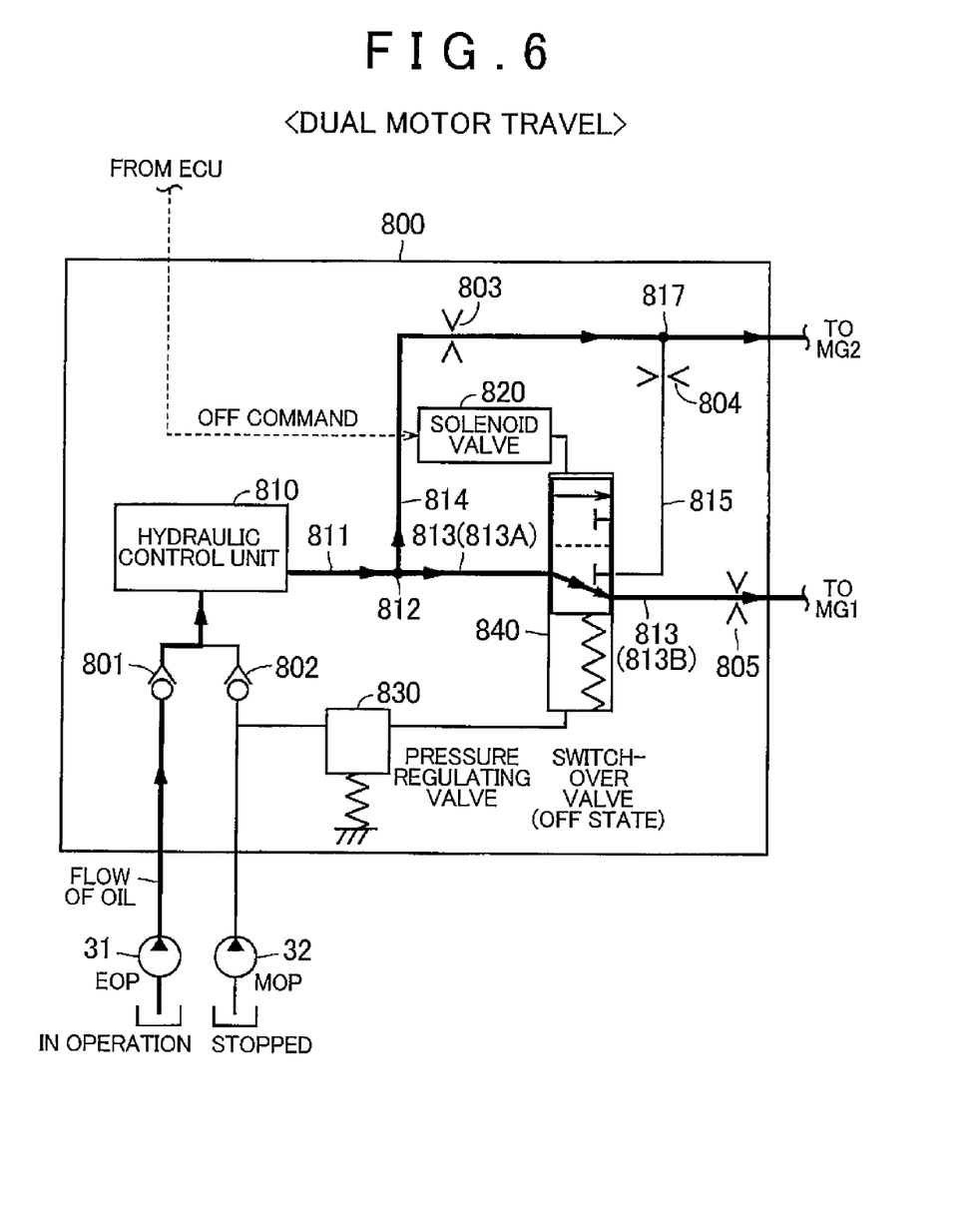
FIG. 6 is a diagram showing a flow of oil inside a hydraulic circuit during dual motor travel.

FIG. 6 is a diagram showing a flow of oil inside the hydraulic circuit 800 during dual motor travel. During motor travel, the MOP 32 is stopped and oil from the EOP 31 is supplied to the second MG 400 via the second oil passage 814. In addition, during dual motor travel, since the pilot hydraulic pressure from the solenoid valve 820 is not inputted to the switch-over valve 840, the switch-over valve 840 enters the OFF state. Accordingly, the first oil passage 813A and the first oil passage 813B are communicated with each other and the oil from the EOP 31 is also supplied to the first MG 200. As shown, during dual motor travel, oil is supplied to both the first MG 200 and the second MG 400. As a result, lubrication and cooling of the first MG 200 and the second MG 400 can be performed in a favorable manner.

Figure 7:
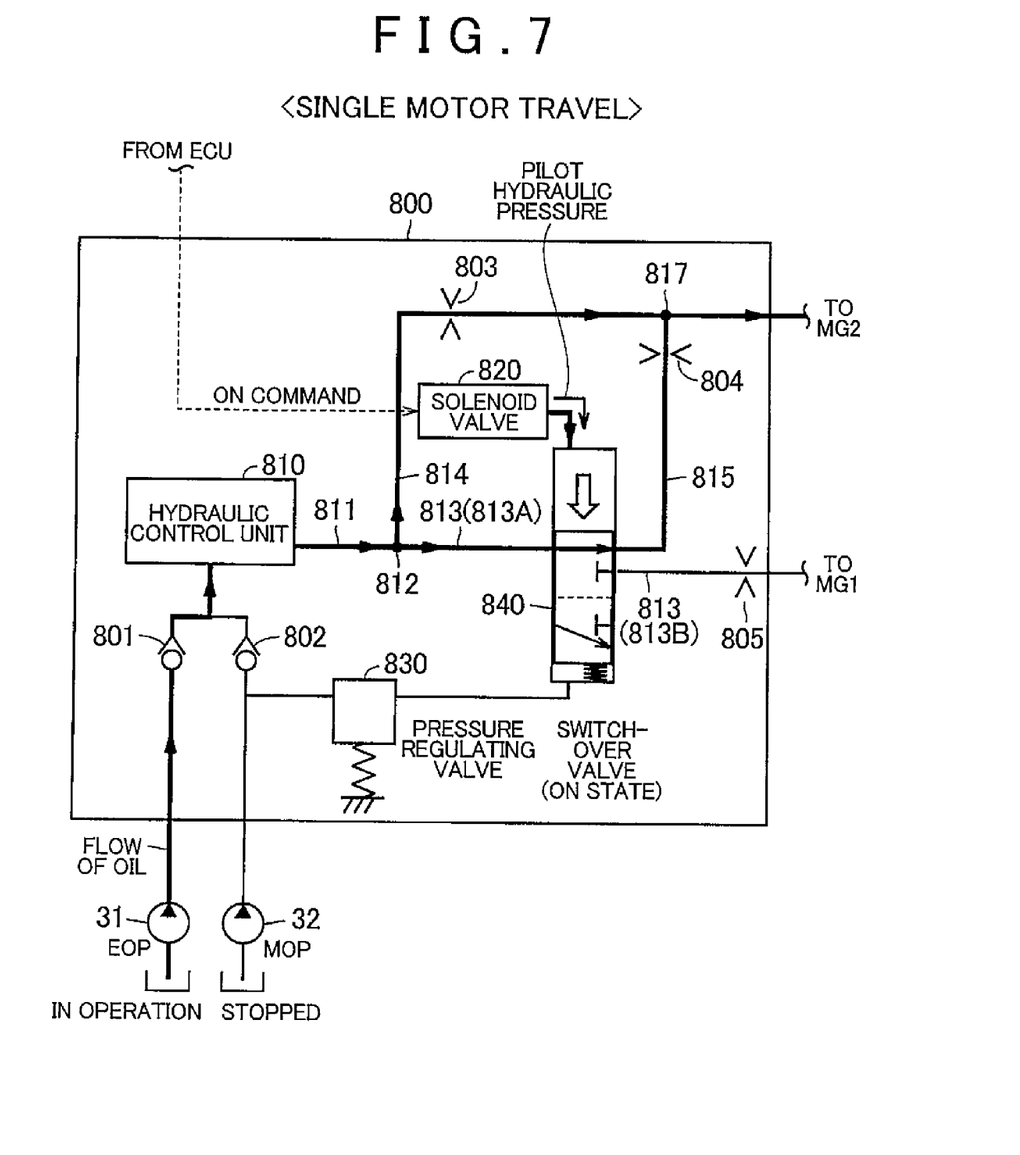
FIG. 7 is a diagram showing a flow of oil inside a hydraulic circuit during single motor travel.

FIG. 7 is a diagram showing a flow of oil inside the hydraulic circuit 800 during single motor travel. During single motor travel, oil from the EOP 31 is supplied to the second MG 400 via the second oil passage 814 in a similar manner to during dual motor travel (refer to FIG. 6 described above). However, during single motor travel, the switch-over valve 840 enters the ON state due to the pilot hydraulic pressure from the solenoid valve 820. Accordingly, the first oil passage 813A and the first oil passage 813B are cut off from each other and the oil from the EOP 31 is not supplied to the first MG 200. Therefore, drag loss occurring at the first MG 200 that does not generate a drive force for vehicle travel is reduced. Furthermore, the first oil passage 813A and the recirculation passage 815 are communicated with each other and the oil from the first oil passage 813A is supplied to the second MG 400. More specifically, oil is supplied to the second MG 400 by two paths, namely, a path that passes through the second oil passage 814 (the orifice 803) and a path that passes through the recirculation passage 815 (the orifice 804). Therefore, compared to a case where oil is supplied to the second MG 400 solely by the path that passes through the second oil passage 814, fluid loss when supplying oil to the second MG 400 can be reduced.

During engine travel, the switch-over valve 840 is placed in the OFF state by the backup hydraulic pressure regardless of the presence or absence of the pilot hydraulic pressure. In other words, the pilot hydraulic pressure is not required. Therefore, during engine travel, the ECU 1000 outputs the OFF command to the solenoid valve 820. Accordingly, unnecessary energization at the solenoid valve 820 is suppressed.

Figure 8:
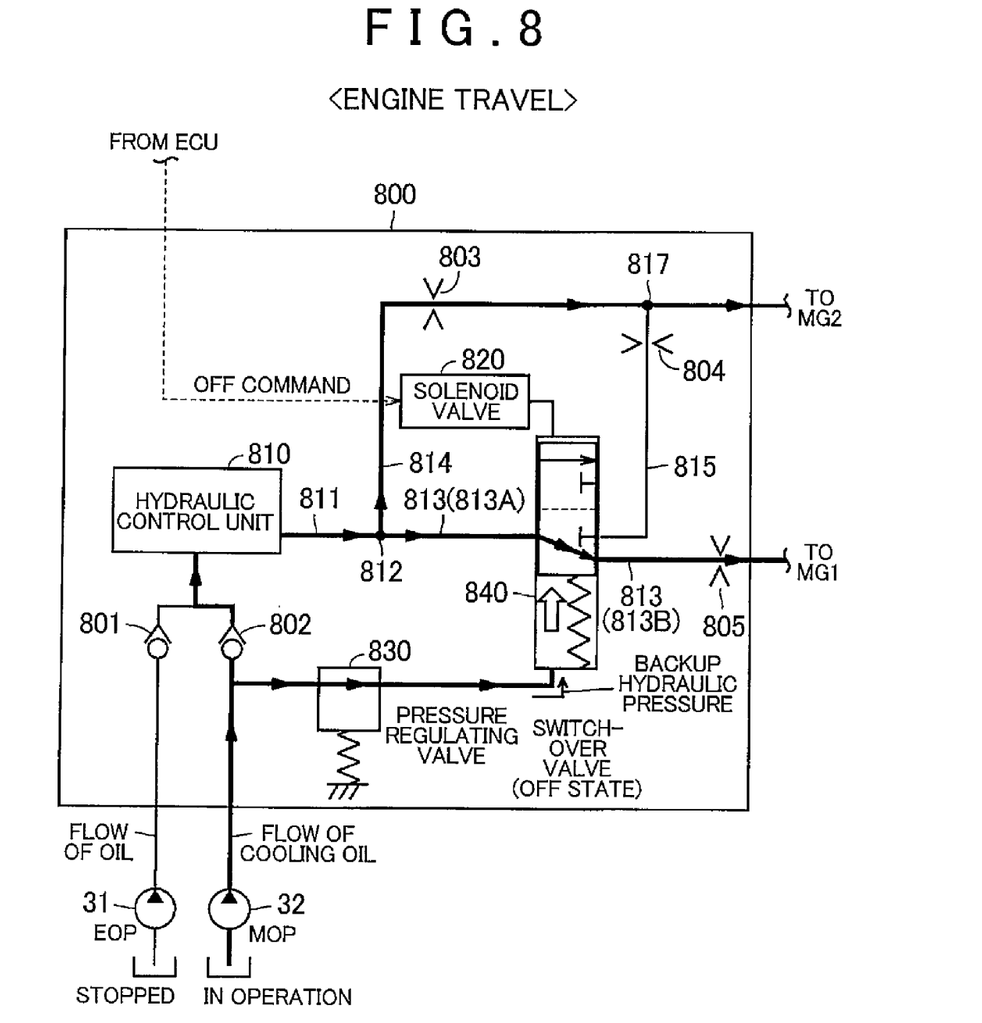
FIG. 8 is a diagram showing a flow of oil inside a hydraulic circuit during engine travel.

FIG. 8 is a diagram showing a flow of oil inside the hydraulic circuit 800 during engine travel. During engine travel, the MOP 32 is in operation and oil from the MOP 32 is supplied to the second MG 400 via the second oil passage 814.

In addition, during engine travel, the backup hydraulic pressure from the pressure regulating valve 830 is supplied to the switch-over valve 840. Therefore, the switch-over valve 840 enters the OFF state regardless of the presence or absence of the pilot hydraulic pressure. Accordingly, the first oil passage 813A and the first oil passage 813B are communicated with each other and the oil from the MOP 32 is also supplied to the first MG 200. As shown, according to the present embodiment, hydraulic pressure from the pressure regulating valve 830 (hydraulic pressure from the MOP 32) is used as backup hydraulic pressure for switching over states of the switch-over valve 840. Therefore, even in a case where the pilot hydraulic pressure is not allowed to be controlled to a normal value due to a failure of the solenoid valve 820 or the like, by operating the engine 100 and operating the MOP 32, oil supply paths to the first MG 200 and the second MG 400 can be secured.

Figure 9:
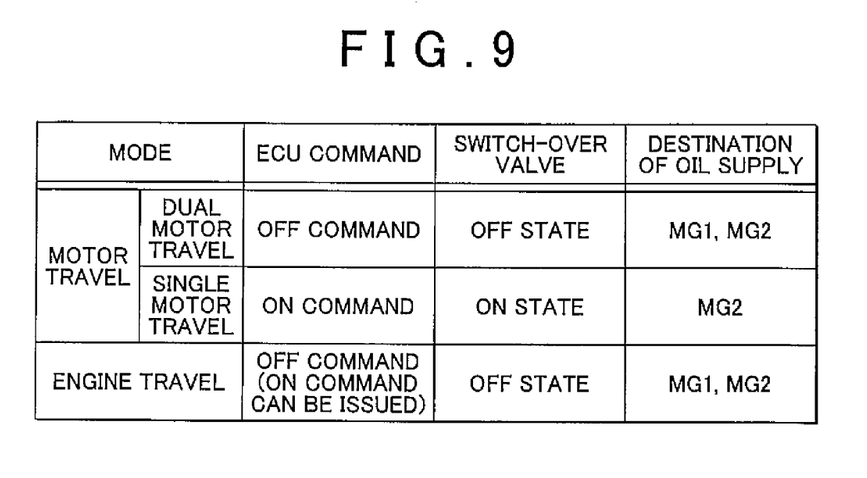
FIG. 9 is a diagram summarizing a relationship between travel modes and states of a switch-over valve.

FIG. 9 is a diagram summarizing a relationship between travel modes and states of the switch-over valve 840. During single motor travel, since the ECU 1000 outputs an OFF command to the solenoid valve 820, the switch-over valve 840 enters the OFF state. As a result, the first MG 200 and the second MG 400 are set as oil supply destinations.

During dual motor travel, since the ECU 1000 outputs an ON command to the solenoid valve 820, the switch-over valve 840 enters the ON state. As a result, the second MG 400 is set as the oil supply destination.

During engine travel, since the backup hydraulic pressure from the pressure regulating valve 830 is supplied to the switch-over valve 840, the switch-over valve 840 enters the OFF state regardless of the presence or absence of the pilot hydraulic pressure. As a result, the first MG 200 and the second MG 400 are set as oil supply destinations. In this case, the ECU 1000 outputs an OFF command to the solenoid valve 820. Moreover, even if the ECU 1000 outputs an ON command to the solenoid valve 820, the switch-over valve 840 is maintained in the OFF state during engine travel. Therefore, an ON command can be outputted during engine travel.

Figure 10:
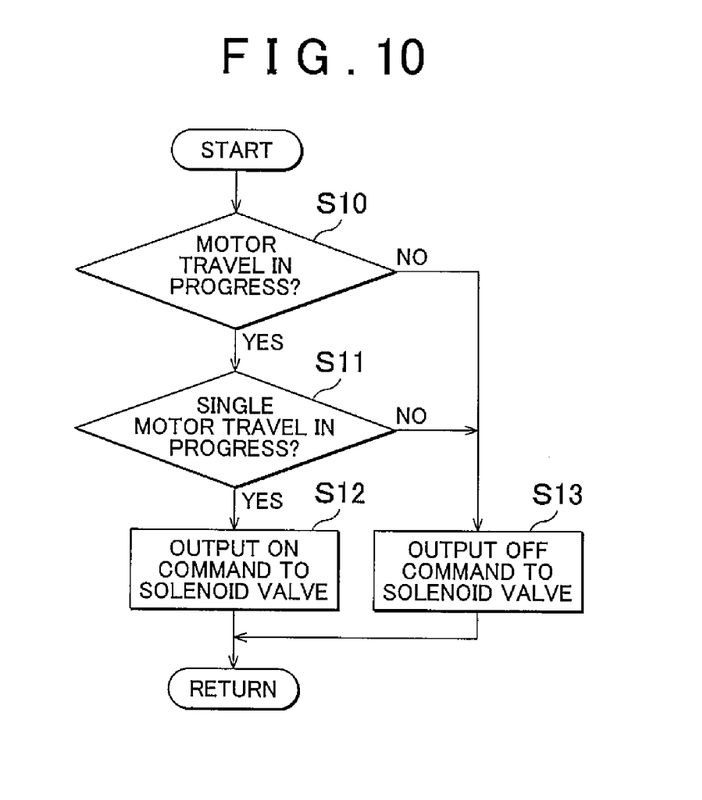
FIG. 10 is a flow chart (first) showing a processing procedure of an ECU.

FIG. 10 is a flow chart showing a processing procedure when a command is outputted by the ECU 1000 to the solenoid valve 820.

In S10, the ECU 1000 determines whether or not motor travel is in progress. When motor travel is in progress (YES in S10), in S11, the ECU 1000 determines whether or not single motor travel is in progress.

When single motor travel is in progress (YES in S11), in S12, the ECU 1000 outputs an ON command to the solenoid valve 820. Accordingly, since the switch-over valve 840 enters an ON state, oil supply to the first MG 200 is cut off.

On the other hand, when dual motor travel is in progress (NO in S11), in S13, the ECU 1000 outputs an OFF command to the solenoid valve 820. Accordingly, since the switch-over valve 840 enters an OFF state, oil is supplied to both the first MG 200 and the second MG 400.

Moreover, even when engine travel is in progress (NO in S10), the ECU 1000 transfers processing to S13 and outputs an OFF command to the solenoid valve 820.

As shown, the vehicle 1 according to the present embodiment includes the hydraulic circuit 800 for cutting off the supply of oil to the first MG 200 during single motor travel. Accordingly, drag loss that occurs at the first MG 200 during single motor travel can be reduced.

Moreover, while a case where supply of oil to the first MG 200 is cut off during single motor travel has been described in the present embodiment, oil supply cutoff is not necessarily restrictive. For example, an oil supply amount to the first MG 200 during single motor travel can be reduced to below an oil supply amount to the first MG 200 during dual motor travel.

Modification

While supply of oil to the first MG 200 is cut off during single motor travel in the embodiment described above, the first MG 200 is rotated with the rotation of the second MG 400 even during single motor travel as described earlier with reference to FIG. 4. Therefore, even during single motor travel, the first MG 200 requires a certain amount of lubricating oil.

In consideration thereof, in the present modification, oil is temporarily supplied also to the first MG 200 when single motor travel is continued for a long period of time.

Figure 11:
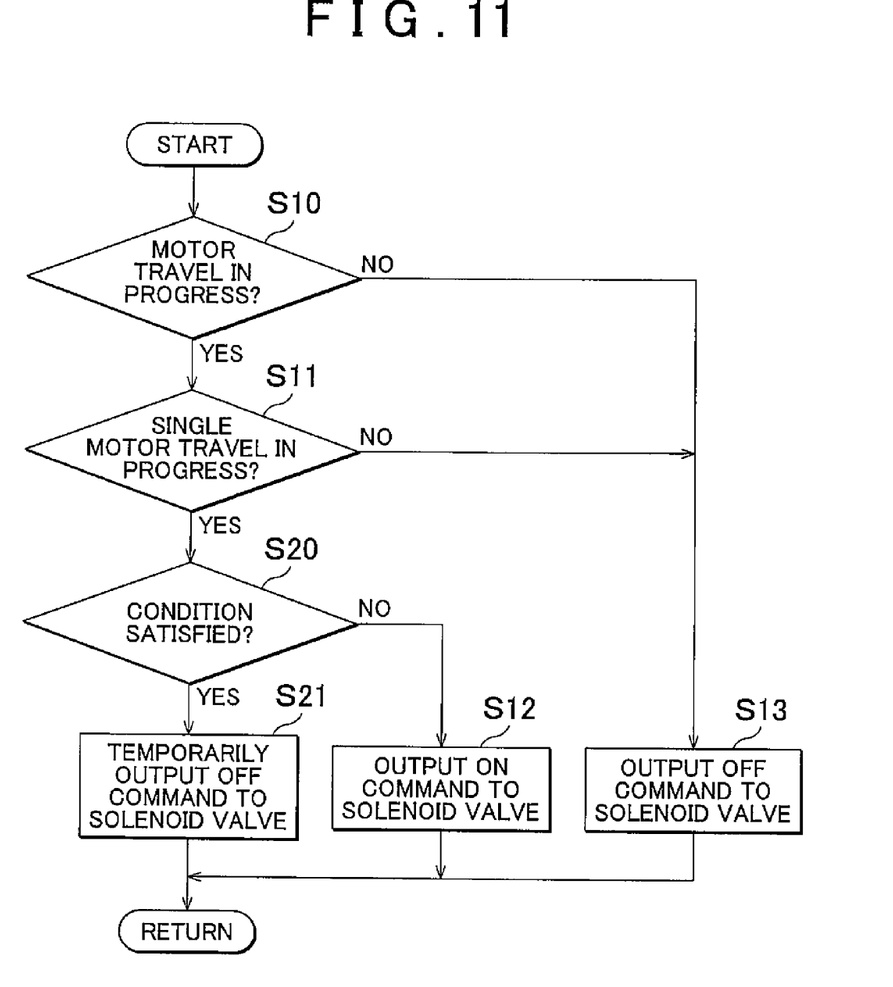
FIG. 11 is a flow chart (second) showing a processing procedure of an ECU.

FIG. 11 is a flow chart showing a processing procedure when a command is outputted by the ECU 1000 to the solenoid valve 820 according to the present embodiment. Moreover, among steps shown in FIG. 11, steps denoted by the same numerals as those shown in FIG. 10 described earlier have already been described. Therefore, a description of these steps will not be repeated.

When single motor travel is in progress (YES in S11), in S20, the ECU 1000 determines whether or not a prescribed condition has been satisfied. In this case, the prescribed condition includes at least any of a condition that a duration of the single motor travel has exceeded a prescribed period of time and a condition that a travel distance by the single motor travel has exceeded a prescribed distance.

When the prescribed condition is not satisfied (NO in S20), in S12, the ECU 1000 outputs an ON command to the solenoid valve 820.

When the prescribed condition is satisfied (YES in S20), in S21, the ECU 1000 temporarily outputs an OFF command to the solenoid valve 820. Accordingly, oil is temporarily supplied also to the first MG 200. Accordingly, even when single motor travel is being continued for a long period of time, oil (lubricating oil) can be temporarily supplied to the first MG 200.

The embodiments disclosed herein should be considered in all respects illustrative and not restrictive. It is intended that the scope of the invention be defined not by the description given above but rather by the claims appended hereto and that the scope of the invention include equivalents thereof and all modifications made therein.

What is claimed is:

1. A vehicle including a first motor, a second motor, and an engine as drive sources, the vehicle comprising:
   a mechanical pump that discharges oil using power from the engine;
   an electric pump that discharges oil using electricity;
   a first oil passage for supplying oil discharged from at least one of the mechanical pump and the electric pump to the first motor;
   a second oil passage for supplying oil discharged from at least one of the mechanical pump and the electric pump to the second motor;
   a switch-over valve provided on the first oil passage and capable of switching over to any of a first state in which the oil flowing through the first oil passage is allowed to be supplied to the first motor and a second state in which the oil flowing through the first oil passage is not allowed to be supplied to the first motor; and
   a switch control valve that outputs hydraulic pressure to the switch-over valve,
   the switch-over valve being configured to switch over to any of the first state and the second state in accordance with hydraulic pressure from the switch control valve and hydraulic pressure from the mechanical pump, wherein
   the switch control valve is a solenoid valve, the vehicle further comprises a pressure regulating valve that regulates the hydraulic pressure from the mechanical pump and outputs the regulated hydraulic pressure to the switch-over valve, and the switch-over valve is configured to switch over to any of the first state and the second state in accordance with hydraulic pressure from the solenoid valve and hydraulic pressure from the pressure regulating valve, wherein
   the switch-over valve is configured to enter the first state if hydraulic pressure from the solenoid valve is not inputted when hydraulic pressure from the pressure regulating valve is not inputted, and to enter the second state if hydraulic pressure from the solenoid valve is inputted when hydraulic pressure from the pressure regulating valve is not inputted, and to enter the first state regardless of whether or not hydraulic pressure from the solenoid valve is inputted when hydraulic pressure from the pressure regulating valve is inputted.

2. A vehicle including a first motor, a second motor, and an engine as drive sources, the vehicle comprising:
   a mechanical pump that discharges oil using power from the engine;
   an electric pump that discharges oil using electricity;
   a first oil passage for supplying oil discharged from at least one of the mechanical pump and the electric pump to the first motor;
   a second oil passage for supplying oil discharged from at least one of the mechanical pump and the electric pump to the second motor;
   a switch-over valve provided on the first oil passage and capable of switching over to any of a first state in which the oil flowing through the first oil passage is allowed to be supplied to the first motor and a second state in which the oil flowing through the first oil passage is not allowed to be supplied to the first motor; and
   a switch control valve that outputs hydraulic pressure to the switch-over valve,
   the switch-over valve being configured to switch over to any of the first state and the second state in accordance with hydraulic pressure from the switch control valve and hydraulic pressure from the mechanical pump, wherein
   the switch-over valve is configured to supply oil flowing through the first oil passage to the second motor when the switch-over valve is in the second state.

3. A vehicle including a first motor, a second motor, and an engine as drive sources, the vehicle comprising:
   a mechanical pump that discharges oil using power from the engine;
   an electric pump that discharges oil using electricity;
   a first oil passage for supplying oil discharged from at least one of the mechanical pump and the electric pump to the first motor;
   a second oil passage for supplying oil discharged from at least one of the mechanical pump and the electric pump to the second motor;
   a switch-over valve provided on the first oil passage and capable of switching over to any of a first state in which the oil flowing through the first oil passage is allowed to be supplied to the first motor and a second state in which the oil flowing through the first oil passage is not allowed to be supplied to the first motor;
   a switch control valve that outputs hydraulic pressure to the switch-over valve,
   the switch-over valve being configured to switch over to any of the first state and the second state in accordance with hydraulic pressure from the switch control valve and hydraulic pressure from the mechanical pump, wherein the switch control valve is a solenoid valve, the vehicle further comprises a pressure regulating valve that regulates the hydraulic pressure from the mechanical pump and outputs the regulated hydraulic pressure to the switch-over valve, and the switch-over valve is configured to switch over to any of the first state and the second state in accordance with hydraulic pressure from the solenoid valve and hydraulic pressure from the pressure regulating valve; and a control unit that controls the solenoid valve, wherein the control unit controls the solenoid valve so that the switch-over valve is in the first state during dual motor travel of the vehicle in which the vehicle travels using power of the first motor and the second motor without using power of the engine, and controls the solenoid valve so that the switch-over valve is in the second state during single motor travel of the vehicle in which the vehicle travels using power of the second motor without using power of the engine and the first motor.

4. The vehicle according to claim 3, wherein the control unit controls the solenoid valve so that the switch-over valve temporarily switches over from the second state to the first state when at least any of a condition that a duration of the single motor travel exceeds a prescribed period of time and a condition that a travel distance by the single motor travel exceeds a prescribed distance is satisfied.

\* \* \* \* \*